Patented June 15, 1926.

1,589,311

UNITED STATES PATENT OFFICE.

HARRY HEWITT, OF MANCHESTER, ENGLAND, ASSIGNOR TO THE BRITISH ARKADY COMPANY LIMITED, OF MANCHESTER, ENGLAND, A BRITISH COMPANY.

MANUFACTURE OF BREAD.

No Drawing. Application filed August 19, 1924, Serial No. 732,963, and in Great Britain December 12, 1923.

This invention relates to the manufacture of yeast raised bread. For the production of a bold and well risen loaf it has been found desirable to add to the flour or dough before baking certain salts, those of calcium being of special importance in this connection and leading to several advantages amongst which there may be mentioned (1) the improvement and better control of the whole process of fermentation owing to an acceleration in the propagation of the yeast, the cells of which are thus rendered more vigorous, (2) a smaller consumption of yeast for obtaining the required fermentation in doughs in a given time, owing to the stimulating action of the calcium salts on the yeast propagation, whereby there results a conservation of the solids of the flour and other fermentable substances present, and (3) the compensation for the deficiency, regarded from a physiological standpoint, of calcium salts which usually occurs in white bread.

The salts added to the flour or dough should be fairly soluble in water, and from considerations of convenience in packing and transport it is desirable to use them in the form of a powder. From these points of view many calcium salts are unsuitable; for example certain calcium salts such as the sulphate, and phosphate are only slightly soluble in water, while others, such as calcium chloride are extremely hygroscopic, thus rendering them unsuitable as ingredients of powders. Again other salts such as the nitrate and nitrite have very definite and undesirable physiological effects on the human system, thus prohibiting their use for the purpose in view.

According to the present invention a process of making yeast-raised bread consists in incorporating with the flour or dough before baking a small quantity of a harmless normal mineral salt of lactic acid; thereafter the dough containing the said lactate is baked into bread. An especially suitable lactate for this purpose is calcium lactate, which is free from the various disadvantages mentioned above, and serves the same purpose as a yeast stimulant and bread improver as salts such as calcium sulphate and calcium phosphate which have heretofore been extensively used, these effects moreover being obtained with a much smaller quantity of calcium lactate than with the other calcium salts just mentioned. Calcium lactate also has the advantage that it can be obtained in a pure state, and it is to be understood that when using calcium lactate in carrying out the process according to the present invention the pure salt is employed. Similar good results can be obtained with magnesium lactate, and this salt or the calcium lactate or other harmless lactate which may be employed can be used either alone or in admixture with starch, flour, malt, malt preparations or similar substances or in conjunction with certain other salts, such for example as ammonium or potassium salts.

In practice only a small amount of the lactate is required, for example a quantity of from one to two ounces of calcium lactate to about 280 pounds of flour has been found to give very good results; it is to be understood however that the present invention is not limited to these proportions. For convenience in adding a small quantity to a dough batch the calcium lactate may be previously diluted with flour or other harmless powder comprising dough ingredients.

When calcium lactate is added in the proportions mentioned above the calcium content of the flour calculated as lime is increased by approximately 0.004 per cent. The lime content of a straight flour is approximately .018 to .030 per cent and that of the wheat is approximately from 0.04 to 0.07 per cent. It is thus seen that the addition of this quantity of calcium lactate does not increase the calcium content of the flour above that of the original wheat.

The presence in the dough of a small quantity of a normal mineral salt of lactic acid in accordance with the present invention has been found materially to improve the build and flavour of the resulting loaf, and at the same time to effect an economy in the amount of yeast required to ferment the dough.

What I claim and desire to secure by Letters Patent of the United States is:—

1. A process of making yeast-raised bread which consists in incorporating with the flour or dough before baking a small quantity of a harmless normal mineral salt of lactic acid, substantially free from other salts, whereby reduction of yeast may be effected without affecting the rate of gas evolution.

2. A process of making yeast-raised bread which consists in incorporating with the flour or dough before baking a small quantity of calcium lactate, substantially free from other salts, whereby reduction of yeast may be effected without affecting the rate of gas evolution.

3. A process of making yeast-raised bread according to claim 2, in which the calcium lactate is employed in the proportions of about one to two ounces to about 280 lbs. of flour.

HARRY HEWITT.